United States Patent [19]

Rellermeyer et al.

[11] Patent Number: 4,533,384
[45] Date of Patent: Aug. 6, 1985

[54] PROCESS FOR PREPARING BINDER-FREE HOT-BRIQUETS

[75] Inventors: Heinrich Rellermeyer, Duisburg; Werner Kaas, Dinslaken, both of Fed. Rep. of Germany

[73] Assignee: Thyssen Aktiengesellschaft vorm. August Thyssen-Hutte, Duisburg, Fed. Rep. of Germany

[21] Appl. No.: 504,772

[22] Filed: Jun. 16, 1983

[30] Foreign Application Priority Data

Jun. 22, 1982 [DE] Fed. Rep. of Germany ....... 3223203

[51] Int. Cl.$^3$ ............................................. C21B 13/00
[52] U.S. Cl. ............................. 75/0.5 BA; 75/0.5 R; 75/5; 75/25; 264/125; 419/35
[58] Field of Search .......... 264/125, 237, 30, DIG.25; 75/5, 44 R, 52, 25, 256, 0.5 R, 0.5 BA; 23/313 R; 419/30, 35

[56] References Cited

U.S. PATENT DOCUMENTS

| | | | |
|---|---|---|---|
| 3,125,437 | 3/1964 | Moore | 75/3 |
| 3,564,699 | 2/1971 | Moore | 75/44 R |
| 3,814,598 | 6/1974 | Gabriel et al. | 419/35 |
| 4,071,595 | 1/1978 | Komarek et al. | 264/125 |
| 4,093,455 | 6/1978 | Pietsch | 75/44 R |
| 4,208,367 | 6/1980 | Wunning | 264/125 |
| 4,213,779 | 7/1980 | Carwell | 23/313 R |
| 4,273,575 | 6/1981 | Litzinger et al. | 75/5 |

FOREIGN PATENT DOCUMENTS 321394 10/1929 United Kingdom .

Primary Examiner—Jay H. Woo
Assistant Examiner—Jill Fortenberry
Attorney, Agent, or Firm—Sprung Horn Kramer & Woods

[57] ABSTRACT

The invention relates to a process and an apparatus for preparing binder-free hot-briquets for smelting purposes from ferrous pyrophorous, finely divided solids, such as dry steelmaking-filter dust or slightly granular sponge iron from direct-reduction plants. Before the briquetting stage, oxidizing gas is blown at a temperature of more than 200° C. through the finely divided dry solid containing more than 4% by weight of metallic iron. The flow rate of this gas is controlled in such a way that oxidation of some of the metallic iron raises the temperature of the finely divided solid to 450° to 650° C. This is followed by hot-briquetting.

9 Claims, 3 Drawing Figures

PROCESS FOR PREPARING BINDER-FREE HOT-BRIQUETS

BACKGROUND OF THE INVENTION

The invention relates to a process and an installation for preparing binder-free hot-briquets for smelting purposes from ferrous pyrophorous, finely divided solids, such as dry steelmaking filter dust or finely grained sponge iron from direct-reduction plants.

In making steel, for example by the oxygen lance process, the CO recovery stage collects in filters metallised dust which, depending on the metallic iron content, has pyrophoric or highly pyrophoric properties. Finely grained sponge iron, for example from direct-reduction plants, frequently also has highly pyrophoric properties. These properties make it impossible for said finely divided solids to be bunkered and processed in untreated form.

It is known to briquet customary filter dusts or finely grained sponge iron to which binders have been added. The materials already proposed for use as binders are such products as bitumen and other tar products, molasses, waste sulphite liquor and the like. The disadvantage of these binders is that they, by their presence, reduce the concentration of valuable constituents in the product and frequently introduce impurities, for example sulphur, unwelcome in a subsequent treatment process, or present environmental protection problems. Since the binders are required in large amounts, the costs, which are made up of the price for the binder itself, the transport and storage costs and a number of other costs, are considerable, so that the economics are put into doubt.

German Auslegeschrift No. 1,142,442 discloses a process for briquetting fine ores, in which the ore is mixed with a basic aggregate, such as magnesium hydrate, lime hydrate, limestone or dolomite, and the mixture, without a special binder having been added and in the absence of clay, is briquetted under a high pressure. According to the description part of this Auslegeschrift, the process can also be applied to filter dust (see column 3/4, Table 1). The description does not indicate whether or not this filter dust has pyrophoric properties. The disadvantages of this cold-briquetting process are the high briquetting pressures, compared with hot-briquetting, and the associated high performance required of the briquetting press, and uneven compaction, which results in an inadequate bulk density for the briquet, since problem-free re-use of the filter use in the form of briquets in converters or electrical furnaces requires a sufficiently high bulk density, which must be significantly above that of the metallurgical slag used.

German Auslegeschrift No. 1,123,351 describes a process for preparing briquets, in which ferrous compounds, such as blast furnace flue dust and other ferrous wastes and iron compounds, including natural iron ores, are partially reduced as oxygen is removed. The resulting product consists of iron oxides and metallic iron and is then briquetted by the application of heat and pressure alone, at a temperature below 850° C. and under a pressure greater than 700 kg/cm$^2$. The reducing agent used can be a reducing gas, such as CO or H$_2$, such an organic material as starch or sugar, or such a ferrous compound as ore containing Fe and FeO partially reduced to metallic iron. This process has the disadvantage that before the finely divided ores or other finely divided ferrous materials can be agglomerated, as desired, it is necessary to carry out a reduction process, as in known direct-reduction processes. At some point during this reduction process, it is necessary to raise the finely divided materials to a temperature which permits a subsequent hot-briquetting stage. This procedure, however, cannot be applied to the pyrophorous, finely divided filter dusts or the finely grained sponge iron, since these are already in the metallised state, albeit cooled down to a temperature so low that hot-briquetting is no longer possible.

German Auslegeschrift No. 1,533,852 discloses a process for preparing sponge iron briquets, in which immediately after discharge from a rotary tube furnace the porous sponge iron is briquetted in the hot state at temperatures of 400° to 800° C. and under briquetting pressures of 1,500 to 3,000 kp/cm$^2$ with the proviso that the paired briquetting temperature and pressure values are selected in such a way, within the specified ranges, as to produce a density of more than 5 g/cm$^3$.

German Journal "Sprechsaal-Fachbericht", Volume 102 (1978), Issue 2, pages 58 to 64, also reports on the hot-briquetting of sponge iron. As in the preceding process, the starting material is sponge iron which, because of its hot-discharge temperature, need not be additionally heated before being subjected to hot-briquetting. Neither of these two processes is thus suitable for filter dusts or sponge iron whose discharge temperature is lower than the hot-briquetting temperature.

The object of the invention is then to compact ferrous pyrophorous, finely divided solids without binder in as energy-saving, efficient a way while allowing for the pyrophoric property of the materials and to make smelting possible.

SUMMARY OF THE INVENTION

This object is achieved in a novel manner when, before the briquetting stage, an oxidising gas is blown at a temperature of more than 200° C. through the finely divided dry solid containing more than 4% by weight of metallic iron, at such a gas flow rate that some of the metallic iron is oxidised and thereby raises the temperature of the finely divided solid to 450° to 650° C., and hot-briquetting takes place immediately thereafter.

The oxidising gas used is preferably air or oxygen-enriched air or technically pure oxygen. The oxidising gas can have been preheated.

The finely divided solid thus heated up is compressed into briquets in a briquetting press which is advantageously a roller briquetting press with a nip pressure of more than 6 kN per cm of roller width.

The briquetting press can have on its upstream side an intermediate bunker for the hot finely divided solid, to allow the briquetting press to operate in a continuous manner, which improves the quality of the briquets.

If the finely divided solids to be turned into briquets are free of lime or contain only a small amount of lime, 3 to 6% by weight of fine lime is added to them before the briquetting stage. This leads to the formation of calcium ferrite, and hence to an improvement in the abrasion resistance of the briquets formed.

In contrast to the customary way of briquetting sponge iron, in which water is used for the cooling, the briquets are cooled down to a temperature below 100° C. in an air stream to prevent any reoxidation. The briquets are then introduced into a bunker, where they are aerated to prevent a build-up of heat. The briquets can be taken from the bunker and used in a steelworks.

The invention provides a solution to the problems associated with the processing of dusty or finely grained pyrophorous solids, and enables these materials to be raised in an energy-saving manner to the hot-briquetting temperature. It was to have been expected that blowing oxidising gases through these materials would not be possible without danger, because of the pyrophoric property of the materials.

An apparatus for carrying out the process and comprising a briquetting press with an inlet for briquetting materials, a cooler for the briquets and a bunker, is shown in FIG. 1 which is characterised in that upstream of the briquetting press there is arranged a rotatable drum with an inlet arranged at one end for the finely divided pyrophorous dry solid, with a discharge arranged at the other end for the hot solid at hot-briquetting temperature, with a gas supply line for the oxidising gas and with an inlet for fine lime, and where the residence time of the solid in the drum, the filter dust to the hot-briquetting temperature of 450° to 650° C., the rise in temperature being controlled via the amount of air supplied per unit time and via the residence time in the drum. The inlet 6, the gas line 8, the inlet 9 for fine lime and a discharge 7, which is arranged at the other end of drum 5, are equipped for this purpose with control elements (not shown), so that the residence time of the solid in the drum, the flow rate at which the oxidising gas (air) is added and the amount of fine lime added can be controlled.

In FIG. 2, the rotatable drum 5 is replaced by a moving bed 5a, which is equipped with air injection lines 8a.

The hot filter dust at briquetting temperature is supplied, in both embodiments, via the discharge 7 to the briquetting press 10, in which the filter dust is compressed into briquets. The finished briquets are passed for cooling to a briquet-cooler, which is embodied in the form of a continuous belt 12. Under the belt, there are two fans 13 with which the briquets are cooled to a temperature below 100° C. to prevent any reoxidation. The cooled briquets then pass into a bunker 14 from which they can be taken for use in a steelworks. To avoid a build-up of heat in the bunker, the latter is equipped with a fan 15.

FIG. 3 shows a direct-reduction unit 16 for preparing sponge iron. The sponge iron produced arrives at the sieving device 17, with which the fines which cannot be used directly in a steelworks can be separated out. These fines pass via an inlet 6 as in the embodiments described above, into a rotatable drum 5, in which the temperature is raised to the hot-briquetting temperature by feeding in an oxidising gas (air). If the sponge iron is free of lime or contains only a small amount of lime, fine lime is fed from the lime silo 18 into the drum 5, and is mixed with the finely grained sponge iron. This produces calcium ferrite, which leads to an improvement in the abrasion resistance of the briquets formed. The remaining steps of the process are as described supra, i.e. an oxidizing gas is added and the amount of fine lime is controlled separately from control elements which control the rate at which oxidizing gas is added.

In a further feature of the invention, the rotatable drum is arranged inclined and is equipped with a number of wall-mounted fans for aerating the finely divided solid.

In another embodiment of the invention, the rotatable drum is replaced by a moving bed with gas injection lines to the underside of the moving bed. The gas can also be introduced into a fluidised bed.

The cooler for the briquets preferably consists of a continuous belt having one or more fans. The bunker used for the briquets is equipped with one or more fans to avoid a build-up of heat. The air blown into the bunker as a cooling medium can be replaced by an air/nitrogen mixture or by technically pure nitrogen.

DESCRIPTION OF THE DRAWINGS

The process of the invention and the apparatus of the invention are described below in more detail by means of drawings, in which.

DETAILED DESCRIPTION OF THE INVENTION

Figure 1:
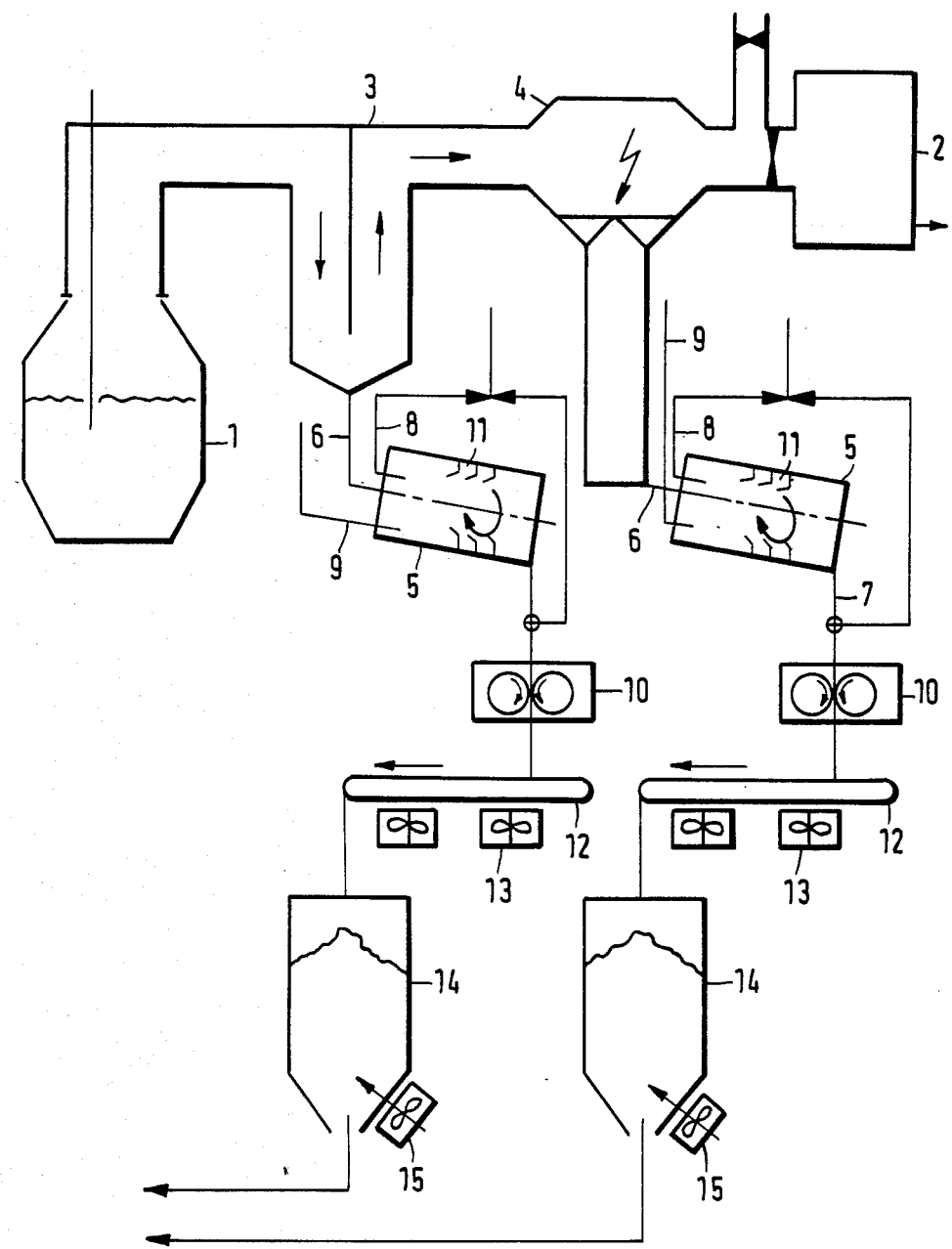
FIGS. 1 and 2 show the novel briquetting of pyrophorous filter dust from a CO recovery unit of a top-blown oxygen converter.
Figure 2:
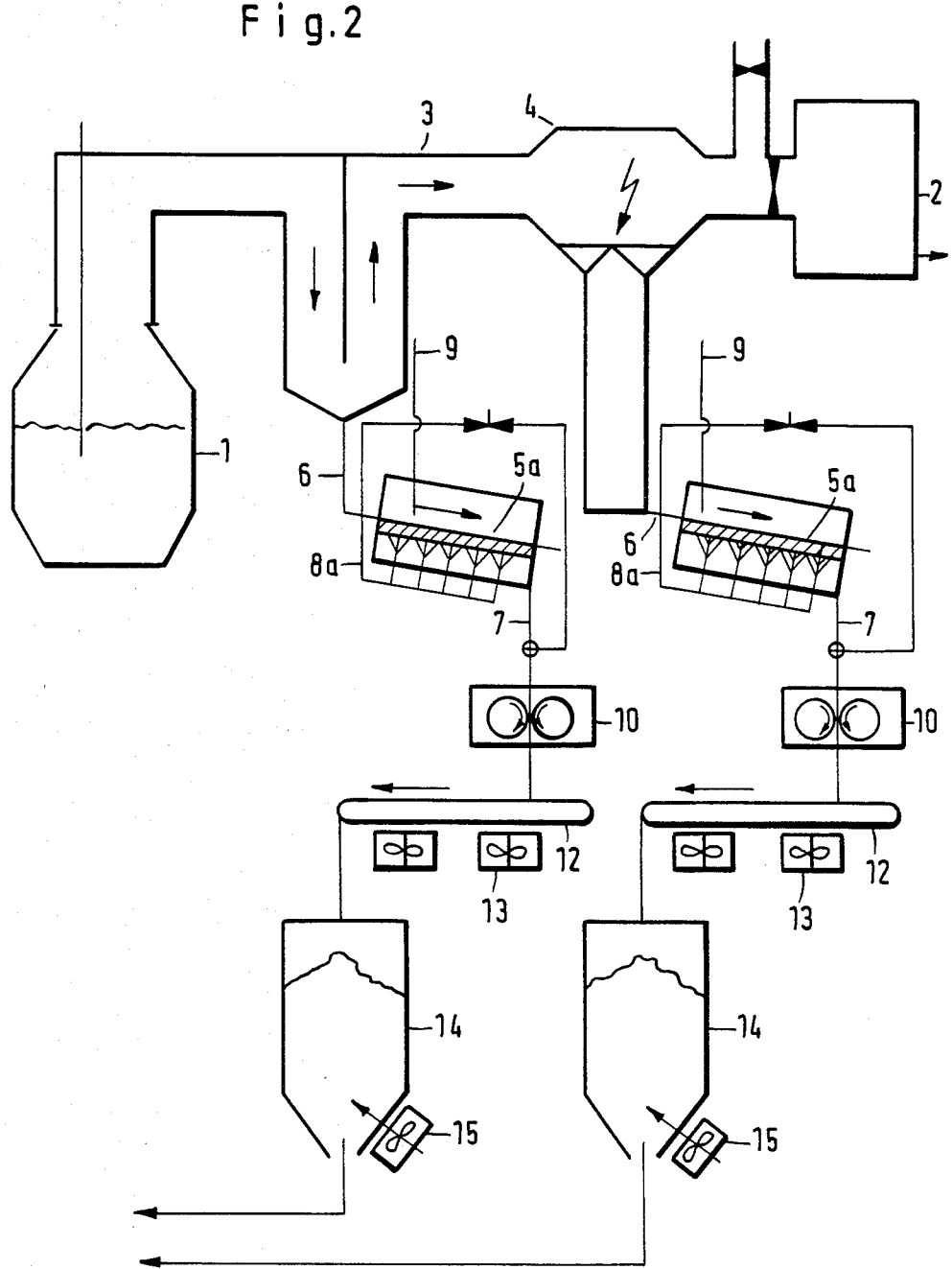
Figure 3:
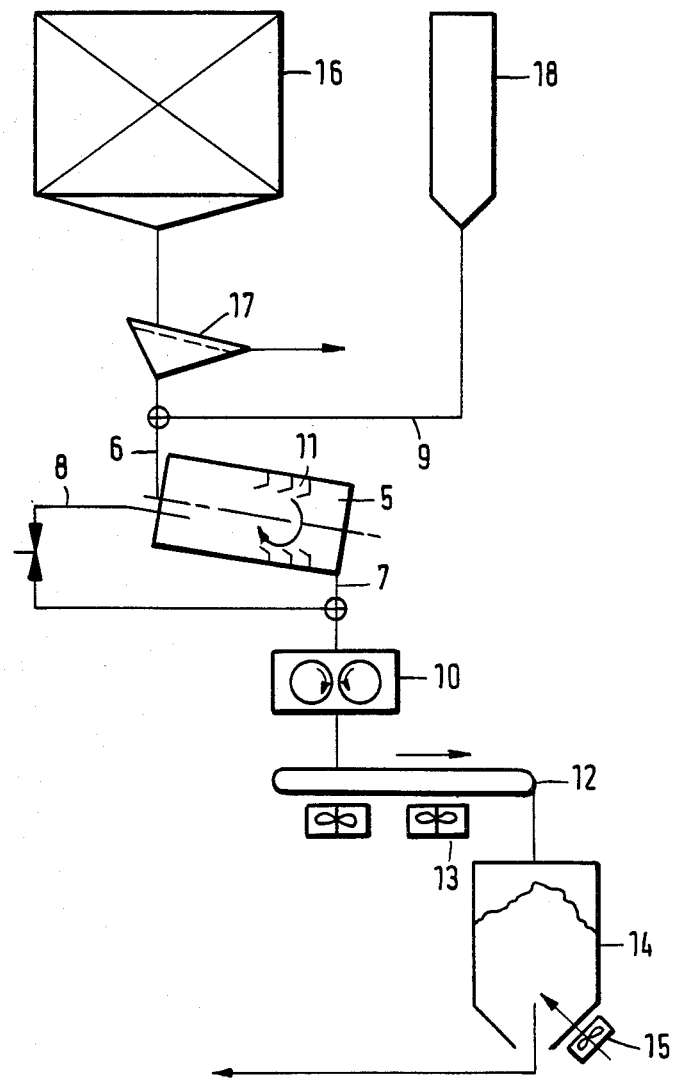
FIG. 3 shows the briquetting of finely grained pyrophorous sponge iron from a direct-reduction plant.

FIGS. 1 and 2 show a top-blown oxygen converter 1, which is equipped with a CO recovery unit 2. The latter has a coarse filter 3 and an electrical filter 4. The finely divided pyrophorous filter dust retained in these filters is passed as shown in FIG. 1 via the inlet 6 into a rotatable drum 5. The rotatable drum 5, which is equipped with wall-mounted aerators 11, has a line for oxidising gas and an inlet for fine lime. The finely divided pyrophorous filter dust, which has a temperature of above 200° C., is treated in the drum with air supplied by the gas line 8. Some of the metallic iron in the filter dust begins to oxidise and raises the temperature of the embodiment described above, and the same equipment components bear the same reference numbers.

The examples summarised in the table below illustrate the invention in more detail, Example 1 depicting the existing procedure and Examples 2 and 3 dealing with embodiments of the invention.

| Process steps | Example 1 | Example 2 | Example 3 |
|---|---|---|---|
| Filter dust discharge from steelworks CO recovery unit | yes | yes | yes |
| Chemical analysis: | | | |
| Fe content | 40–90% | 65.5% | 78.2% |
| Fe$_{met}$ content | 10–70% | 13.0% | 54.7% |
| CaO content | 3–20% | 8.1% | 7.1% |
| Filter dust discharge temperature | 150–600° C. | ~200° C. | ~400° C. |
| Filter dust moistened in the mixer | yes | no | no |
| Moisture content | >5% | — | — |
| Filter dust inlet into the reaction drum by means of controlled air supply | no | yes | yes |
| Filter dust temperature at the reaction drum discharge | — | ~550° C. | ~600° C. |
| Briquetting under a nip pressure (kN per cm of roller width) | — | 100 kN/cm | 110 kN/cm |
| Cooling of the briquets on a belt cooler | — | <100° C. | <100° C. |
| Bunkering of the briquets in a venting bunker (intermediate storage) | — | yes | yes |
| Quality of the briquets: | | | |
| (a) bulk density | | ~4.0 g/cm$^3$ | ~5.5 g/cm$^3$ |
| (b) Cold compressive strength | | 200–500 daN/briquet | 1,000–5,000 daN/briquet |
| Further processing | waste | steel- | steel- |

-continued

| | Example | | |
|---|---|---|---|
| Process steps | 1 | 2 | 3 |
| | disposal | works | works |

We claim:

1. A process for preparing binder-free hot-briquets for smelting purposes from ferrous pyrophorous, finely divided solids comprising before the briquetting stage, blowing an oxidising gas at a temperature of more than 200° C. through the finely divided dry solids containing more than 4% by weight of metallic iron, at such a gas flow rate that some of the metallic iron is oxidised and thereby raising the temperature of the finely divided solids to 450° to 650° C., and hot-briquetting the solids immediately thereafter.

2. The process according to claim 1, wherein the oxidising gas used is air or oxygen-enriched air or technically pure oxygen.

3. The process according to claim 1, wherein pressing is performed using a roller briquetting press exerting a nip pressure of more than 6 kN per cm of roller width.

4. The process according to claim 1, wherein before briquetting 3 to 6% by weight of fine lime is added to the finely divided solids.

5. The process according to claim 1, wherein after briquetting the briquets are cooled by an air stream to a temperature below 100° C.

6. A process according to claim 1, which further comprises cooling down the briquets to a temperature below 100° C. after the hot-briquetting by using an air stream to prevent reoxidation.

7. A process according to claim 1 wherein said finely divided dry solids are dry steelmaking filter dust solids.

8. A process according to claim 7 wherein said dry steelmaking filter dust solids are solids obtained from an oxygen converter.

9. A process according to claim 1 wherein said finely divided dry solids are solids obtained from the direct reduction of an iron oxide containing ore.

* * * * *